Patented Nov. 18, 1947

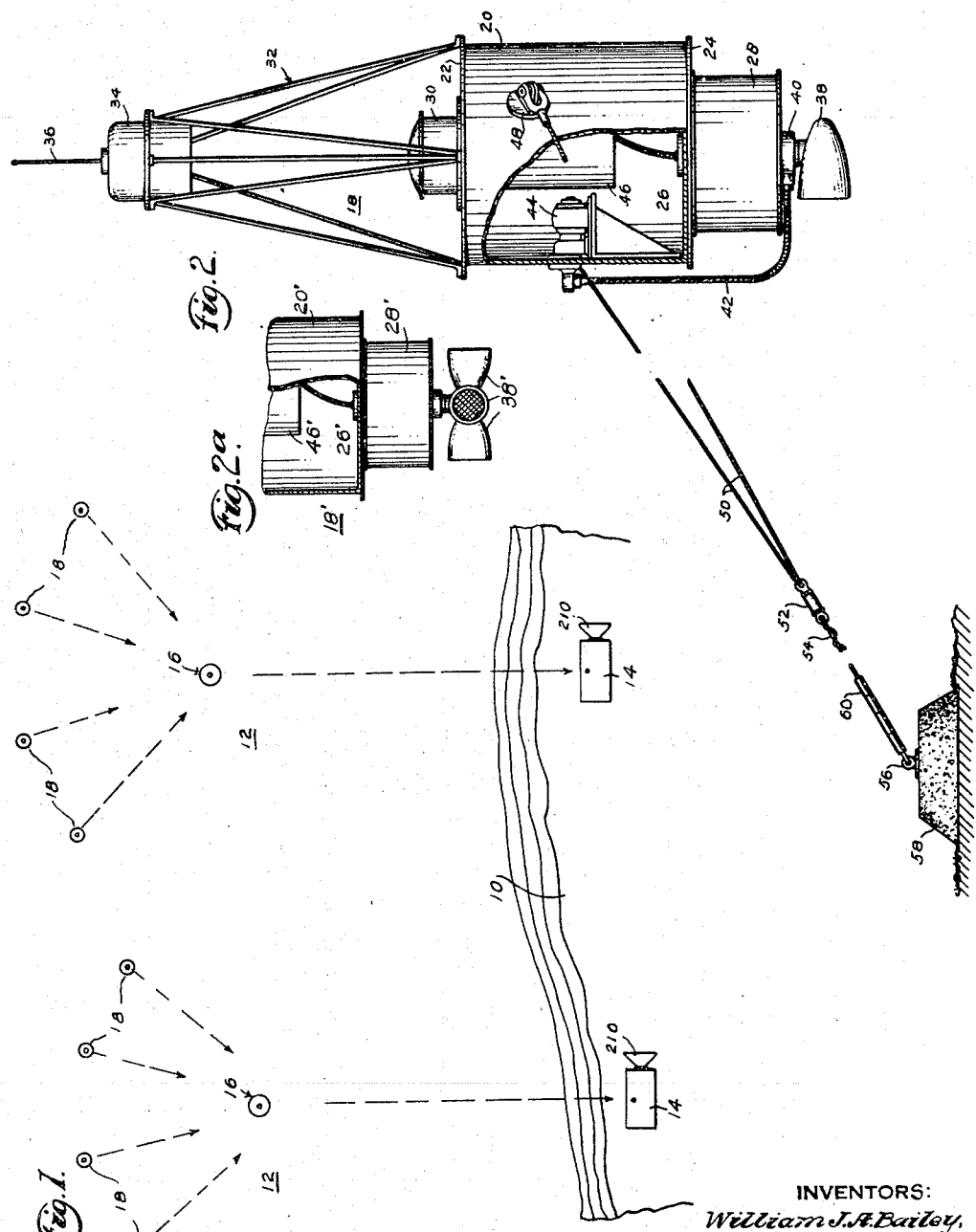

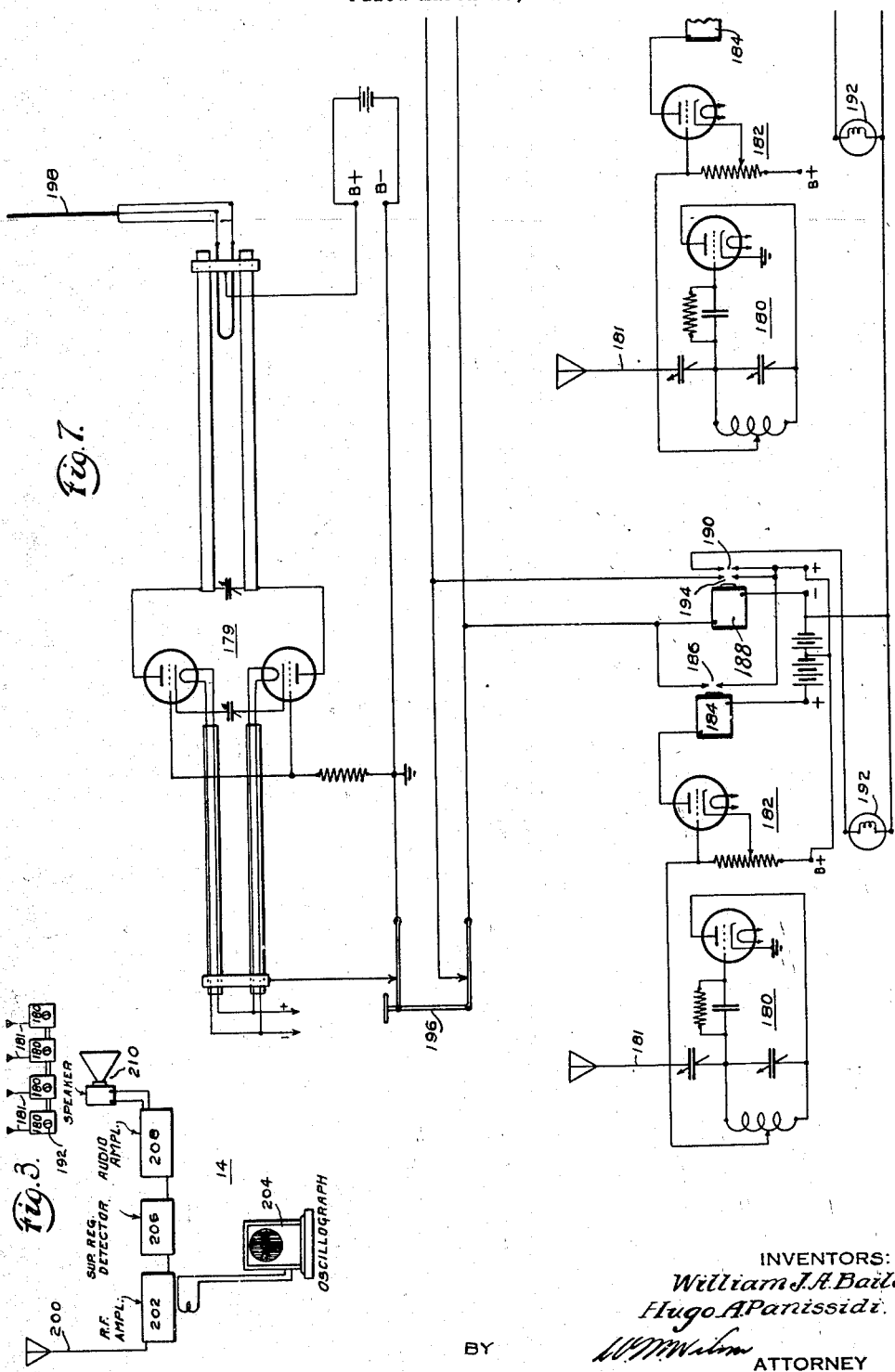

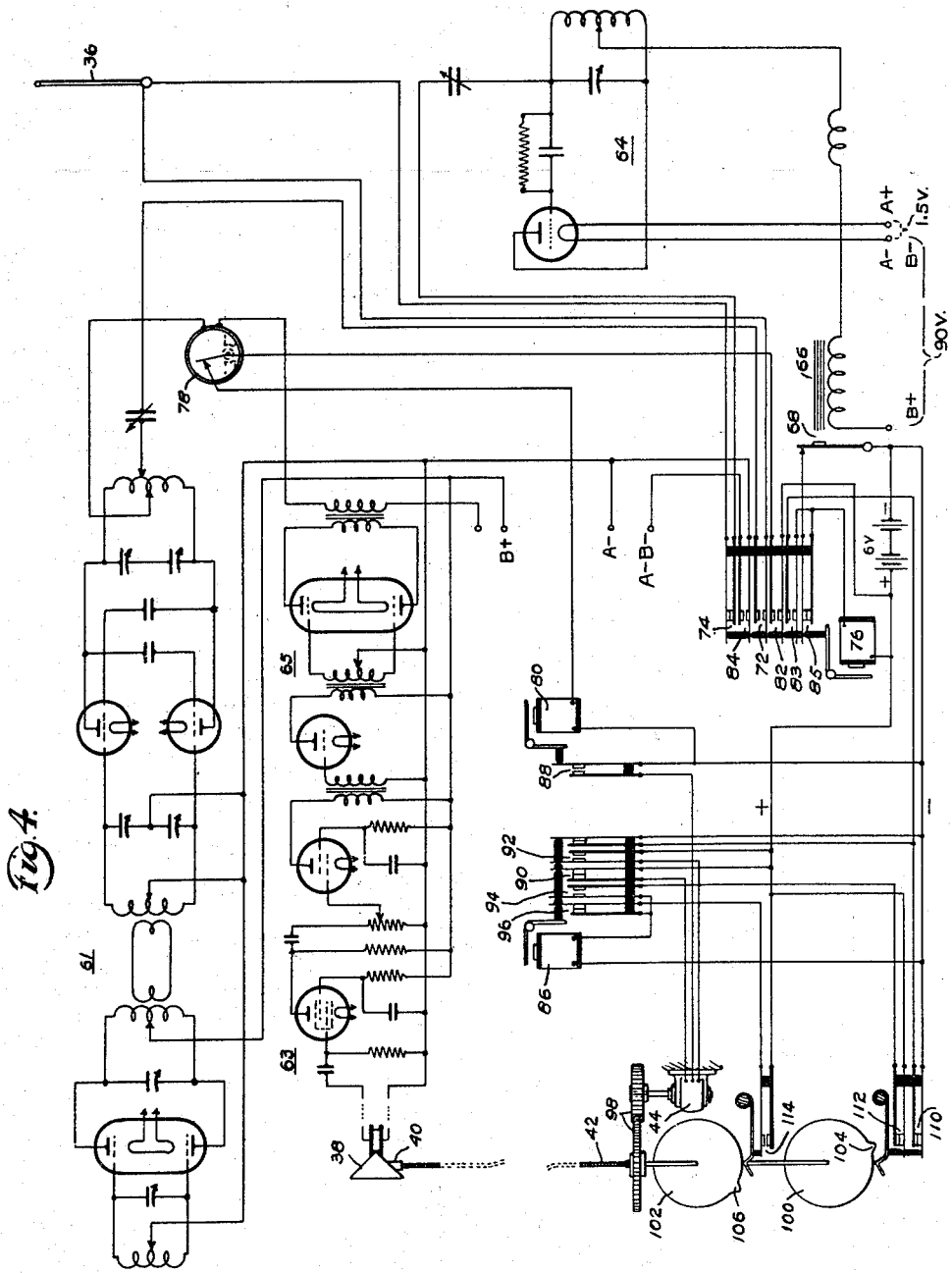

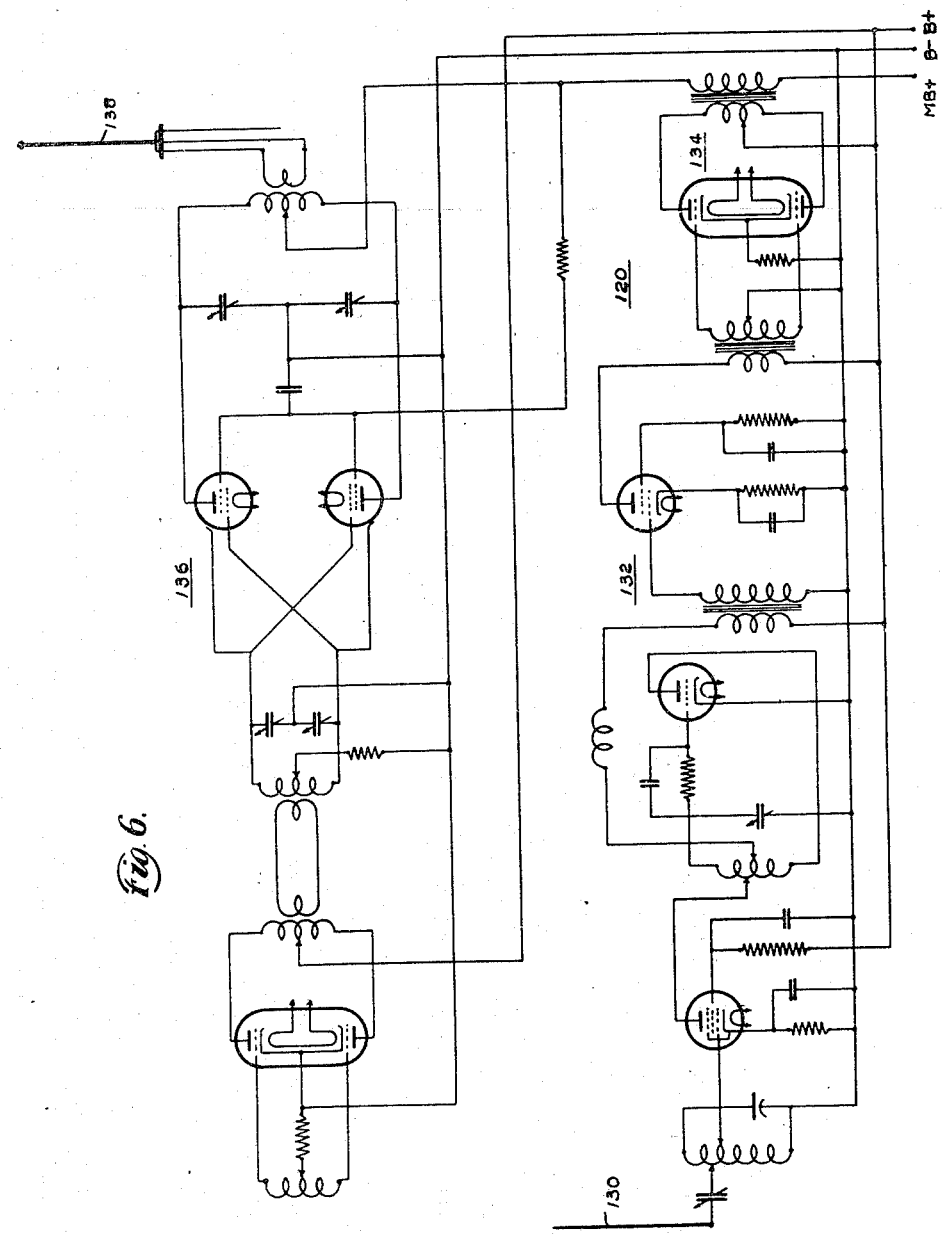

2,431,018

UNITED STATES PATENT OFFICE 2,431,018

SOUND DETECTION SYSTEM AND APPARATUS

William J. A. Bailey, Packanack Lake, N. J., and Hugo A. Panissidi, Jamaica, N. Y., assignors to International Business Machines Corporation, New York, N. Y., a corporation of New York Application March 26, 1943, Serial No. 480,642

9 Claims. (Cl. 177—386)

The improved sound detection system and apparatus comprising the present invention is primarily adapted for use in detecting the presence and location of submarines and surface vessels by the expedient of determining the direction of propagation and intensity of wave energy emanating from such vessels. The invention, however, is susceptible to modification and the same may, with suitable modification, be employed for detecting the presence and location of airplanes or other sound-emitting objects, whether the same be operating on or beneath the surface of a body of water, on the surface of the ground or in the air. As illustrated herein, however, the invention is essentially concerned with the detection of sound propagated through a body of water and emanating from a submarine or surface vessel.

Briefly, the present invention comprises a sound detection system including a central or shore station, a relay station which may be located at a suitable off-shore position, and a plurality of detector stations which may be suitably arranged in off-shore positions about the relay station in spaced relationship, together with means whereby disturbances in the form of sound waves emanating from a submarine or other vessel are received at one or more of the detector stations, are caused to modulate a carrier radio wave of a predetermined fixed frequency, and are amplified and transmitted over the carrier wave to the relay station. The signals are received and further amplified at the relay station and the amplified signals retransmitted from the relay station to the shore station at a predetermined carrier frequency. At the shore station the signals are received and subjected to either audio or visual analysis, while at the same time means are provided for noting which detector station is receiving the original signals so that the approximate location of the disturbance may be ascertained.

The provision of a sound detection system of the character set forth above being the principal object of the invention, another object thereof is to provide a system of this sort wherein the various detector stations may be selected at will by an operator at the central or shore station and upon selection thereof the selected station will be energized and caused to directionally hunt the source of disturbance.

Another object is to provide a system of this sort wherein once the detector station has located a source of disturbance the station will remain "tuned" to the source whether the latter is stationary or is moving.

Still another object of the invention is to provide such a system which insofar as the off-shore relay and detector stations are concerned is fully automatic in its operation and does not require the presence of an operator at these stations, the entire system being attended to by a single operator at the shore station.

Another object is to provide a detector system wherein a single sound disturbance may be received by two or more of the detector stations and, by analysis of the character and intensity of the transmitted sound at the shore station, as received from the various outlying stations, a relatively close estimate of the proximity of the disturbance may be made. In connection with this latter object, the invention is to be distinguished, however, from systems employing the so-called binaural method of sound detection wherein the response of a pair of separated or spaced detectors is evaluated by the ears of the observer through magnified electrical acoustical paths.

Another object of the invention is to provide a novel form of floating off-shore station which may be either in the form of a detector station or of a relay station and which is extremely compact in its design, and waterproof in its construction in order that the various batteries and other electrical equipment which may be housed therein will not be subjected to moisture and consequent deterioration.

Another and similar object is to provide such an off-shore station which is for the most part submerged so as to remain substantially invisible and wherein only the superstructure and its supported antenna remains above the surface of the water.

Other objects and advantages of the invention not at this time enumerated will become apparent as the nature of the invention is better understood.

In the accompanying five sheets of drawings forming a part of this specification, one embodiment of the invention is shown.

In these drawings:

Fig. 1 is a schematic view of the improved system and showing a central or shore station, an off-shore relay station and a plurality of off-shore detector stations suitably arranged to cover a predetermined area off-shore from the coast line.

Fig. 2 is a side elevational view, partly in section, of a floating detector station employed in connection with the present invention and showing the same in actual off-shore use and utilizing a single rotary crystal detector unit.

Fig. 2a is a fragmentary view showing a modified form of a floating detector station utilizing a plurality of unidirectional crystal detector units.

Fig. 3 is a schematic view of the arrangement of equipment employed at the central or shore station.

Fig. 4 is a diagrammatic view of the radio and other equipment employed at each of the detector stations.

Fig. 6 is a similar diagrammatic view showing the radio receiver-transmitter employed at the relay station, and Fig. 7 is a diagrammatic view showing the transmitter employed at the central or shore station for actuating the selector equipment at the relay station.

In all of the above views like characters of reference are employed to designate like characters throughout.

Figure 5:
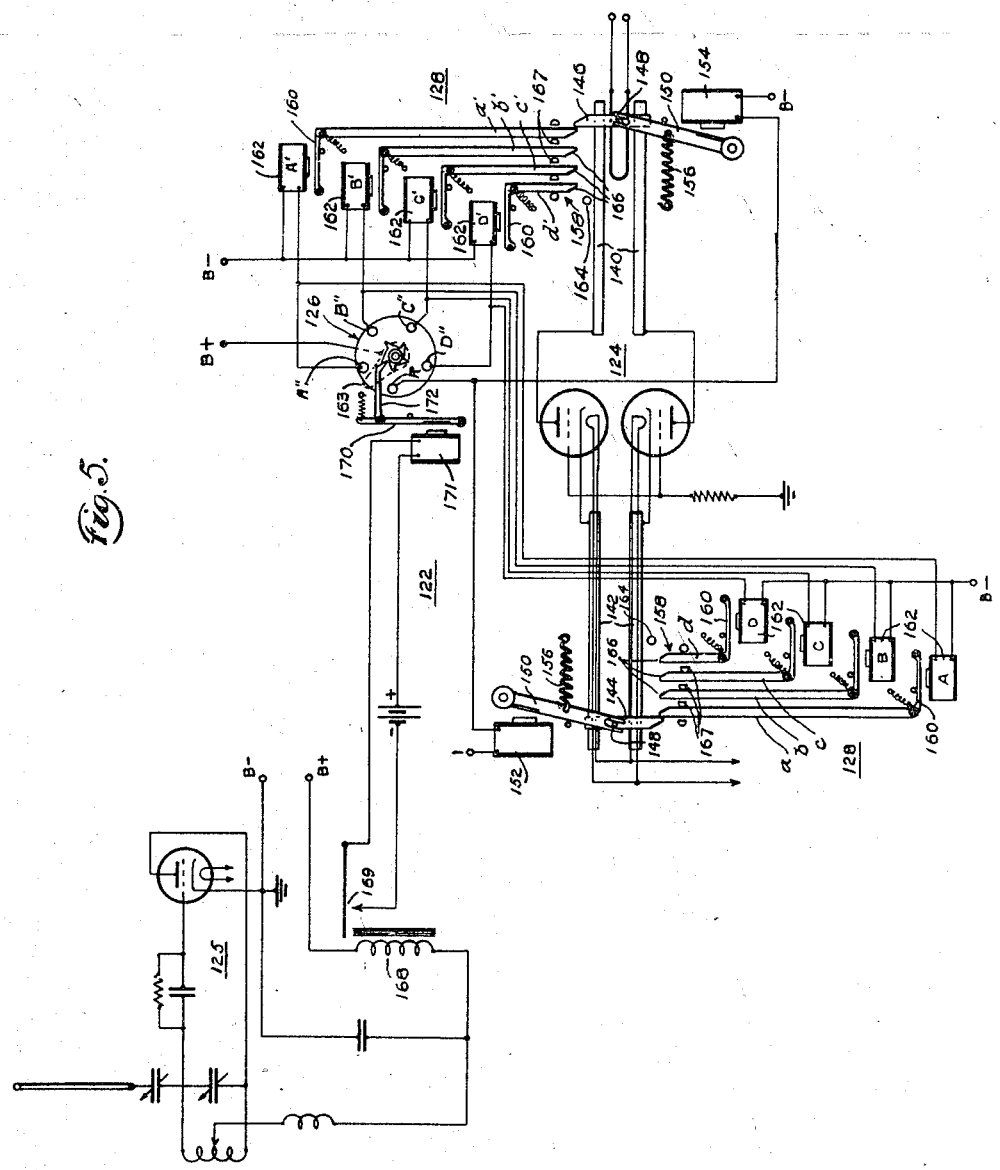
Fig. 5 is a diagrammatic view similar to Fig. 4 showing the selector equipment employed at the relay station.

Referring now to the drawings in detail and specifically to Fig. 1, a limited strip of coastline is indicated at 10, the disclosure being made in conventional map form and the outlying water regions being indicated at 12. A shore station 14 under the control of a single operator is in radio communication with an automatically operable floating off-shore relay station 16 and this latter station is capable of selectively receiving signals from any one of a plurality of floating off-shore detector stations 18 which may be of any desired number and of which, for convenience, four have been shown.

The shore station 14 may be located at any convenient point near the coastline, as for example, within a mile or so from the same and since its exact location is not important it may be suitably concealed by topographic or by artificial means. The relay station 16 may be located at any desired point off-shore and, according to the present invention, it may be removed from the shore station 14 a distance as great as thirty miles. Similarly, the various detector stations 18 may be suitably spaced about the relay station 16 as desired, but it is contemplated that in the present embodiment they shall be located from two to ten miles from this latter station and that they shall be spaced from about one to five miles from each other. Irrespective, however, of the specific locations of the various stations involved, the essential features of the invention remain substantially the same.

*The detector stations*

The various detector stations 18 are substantially identical in construction and one of them is illustrated in Fig. 2. This station consists of a generally cylindrical outer casing or shell 20 including an upper deck 22 and a bottom 24, the whole forming a substantially water-tight chamber 26. A cylindrical counterweight 28 depends centrally from the bottom 24 and serves to maintain the floating device erect in the water at all times. A conventional hatch 30 associated with the deck 22 affords access to the interior of the chamber 26.

Extending upwardly from the deck 22 is a superstructure or tower 32, which is generally of tapered form and which carries at its upper end a generally cylindrical container 34 in which there is housed a radio apparatus, the details of which are shown diagrammatically in Fig. 4. The radio apparatus includes a transmitter and a superregenerative receiver, the electrical details of which are shown in Fig. 4 and which will be described presently. An antenna 36 serves for both the transmitter and receiver and is carried near the upper end of the superstructure 32.

Depending from the underneath side of the counterweight 28 centrally thereof is a rotatable microphone or sound pick-up unit 38, the rotation of which is controlled through a worm and gear arrangement 40 and flexible cable 42, by means of a reversible direct current motor 44. A battery compartment 46 may be suitably suspended beneath the hatch 30 for reception of the batteries which are requisite for operation of the transmitter and receiver.

In order that the floating station 18 may be anchored in the desired location, a pair of eye shackles 48 have secured thereto a bridle 50 which is attached by a swivel joint 52 to a cable 54, and the latter is secured to an eyelet 56 carried by a cement or other anchor 58. Sections of armored sleeving 60 surround the lower portion of the cable 54 for protective purposes in order that the cable may be protected from the cutting action of jagged rocks and the like, and from the formation of barnacles, etc.

Referring now to Fig. 4 wherein the electrical apparatus at the various detector stations 18 is diagrammatically shown, this apparatus includes a normally deenergized transmitter 61 which preferably operates at a selected ultra high frequency, an amplifier 63 for amplifying sound received by the pick-up unit 38, and means 65 for modulating the carrier frequency of the transmitter with the amplified sound signals. The apparatus also includes means for energizing the apparatus when selection thereof is made at the shore station 14 through the relay station 16, together with means for controlling the rotation of the sound pick-up unit.

As will be presently set forth, means are provided at the relay station 16 for transmitting signals at various selected frequencies, the selection being made at the shore station 14. Each of the detector stations 18 is adapted to receive these transmitted signals at the particular frequency at which it is designed to operate and, upon reception thereof, to become energized and set into operation. Toward this end, a superregenerative receiver 64 of more or less conventional design is provided with a high resistance relay electromagnet 66 in its plate input circuit. The receiver 64 is normally maintained energized and oscillates at a suitable audio frequency, as for example, 400 cycles in order that a relatively large amount of plate current will flow through the winding of the electro-magnet 66 and maintain the same energized, while at the same time a pair of contacts 68 controlled thereby remain open. Upon reception of a particular predetermined radio frequency signal from the relay station the audio oscillations will cease and a sharp decrease of plate current will result, thus deenergizing the high resistance electromagnet 66 and allowing the contacts 68 to become closed to energize a control relay electromagnet 76.

The antenna 36 is common to the receiver 64 and transmitter 61 and is maintained normally disconnected from the latter by a pair of normally open contacts 72 and connected to the former by a pair of normally closed contacts 74, both of which pairs of contacts are under the control of the control relay 76. A sensitive galvanometer type relay 78 serves normally to potentially close a circuit leading to a motor starting relay magnet 80 and the circuit is adapted to become effectively closed upon closure of a pair of normally open contacts 82 operating under the control of the electromagnet 76. An additional pair of normally open contacts 84 which are controlled by the magnet 76 operate upon closing to supply power to the transmitter and modulator units. The relay magnet 76 is provided with a pair of normally open locking contacts 83 and a pair of normally closed contacts 85 through which initial energization of the magnet is effected. It will be seen, therefore, than an initial impulse applied to the magnet 76 is sufficient to cause the same to become fully energized and locked in an energized condition and that subsequent deenergization of the high resistance magnet 66 will have no effect on the various motor control circuits.

Still referring to Fig. 4, means are provided for periodically rotating the directional sound pick-up unit located beneath the detector buoy 18 throughout an angle of 360°, first in one direction and then in the other direction. Accordingly, the motor 44 operates under the control of a motor direction control relay magnet 86 and is adapted to be energized upon closure of a pair of contacts 88 which are controlled by the motor starting relay magnet 80. Rotation of the motor 44 in one direction is controlled by means of a pair of contacts 90 associated with the relay magnet 86, while reverse rotation thereof is controlled by means of a pair of contacts 92. When the magnet 86 is deenergized the contacts 90 remain closed and when the magnet is energized the contacts 92 become closed. Thus it will be seen that upon either energization or deenergization of the relay magnet 86 the direction of rotation of the motor 44 will change. A pair of contacts 94 associated with the magnet 86 are employed for locking purposes and a pair of contacts 96 are provided through which initial energization takes place.

As set forth previously, rotation of the directional sound pick-up unit 38 is effected through the gear reduction device 40 and flexible cable 42. The cable 42 is connected to the motor 44 through a pair of cooperating gears 98. The cable 42 is also connected to a pair of cam members 100 and 102, the former having a cam projection 104 thereon and the latter having a similar cam projection 106 associated therewith. The projection 104 operates to open two pairs of normally closed contacts 110 and 112, while the projection 106 operates to close a pair of normally open contacts 114. The pair of contacts 110 are disposed in the circuit of the control relay magnet 76 and operate when opened by the projection 104 to unlock or deenergize this magnet. The pair of contacts 112 are similarly disposed in the circuit of the direction control relay magnet 86 and operate when opened by the projection 104 to unlock or deenergize this latter magnet. The pair of contacts 114 are disposed in series with the pair of locking contacts 96 and operate when closed by the projection 106 to energize the motor direction control relay and allow the same to become immediately locked.

In the operation of the various motor control circuits just described, reception of a signal of the proper frequency will cause deenergization of the high resistance electromagnet 66, whereupon the control relay electromagnet 76 will become energized and locked. Such energization of the control relay will cause closing of the contacts 82 and subsequent energization of the motor starting relay magnet 80, which in turn causes the motor to rotate in a forward direction, thus driving the sound pick-up unit 38 in one direction. If no sound disturbance is encountered by the pick-up unit 38 the same will continue to rotate until such time as the cam projection 106 operates to close the pair of contacts 114, at which time the motor direction control relay 86 will become energized and locked and the direction of rotation of the motor 44, and consequently of the sound pick-up unit 38, will be reversed. When the cam projection 104 operates to open the pairs of contacts 110 and 112, the motor direction control relay magnet 86 and also the control relay 76 will become deenergized and deenergization of this latter relay will cause the motor starting relay 80 to become deenergized to break the common power line leading to the motor 44. The positions of the contacts 72 and 74 will become reversed and the antenna 36 will again become disconnected from the transmitter 61 and connected to the receiver 64. If at this point a signal is not transmitted from the relay station 16, the entire detector apparatus will become inoperative.

If, during energization of the detector apparatus and rotational travel of the sound pick-up unit 38, a rhythmic sound wave is encountered by the latter, the sound will be amplified by the amplifier 63 and the modulator 65 will serve to impress or modulate the carrier signal of the transmitter 61 with the signal. All of the transmitters 61 of the various detector stations 18 are designed to operate at the same carrier frequency. The modulated carrier is received by the relay station 16 and it is retransmitted to the shore station in a manner that will be set forth presently.

Because of the increased power level of the modulator plate circuit when a signal is received by the pick-up unit 38, the sensitive galvanometer type relay 78 will become energized to break the circuit of the winding of the motor starting relay magnet 80, thus stopping the motor 44 and maintaining the pick-up unit 38 aligned with the direction of propagation of the initial disturbance. Such alignment of the pick-up unit 38 with the source of the disturbance will be maintained permanently if the source is not moving, and if it is moving the alignment will be maintained temporarily for a greater or lesser period of time, depending upon the direction and speed of movement of the source. Since the sound pick-up rotates throughout an angle of 360° first in one direction and then in the opposite direction, and since the source of sound is most likely moving, obviously the pick-up will encounter the source of disturbance either as it is moving counter to the direction of movement of the source or as it is moving with the direction of the movement of the source. In the first instance, after the source of disturbance has moved out of the range of the pick-up, the pick-up will rotate to its position of direction change and after reversal again meet the source of sound. Thereafter, the pick-up will hunt the source of disturbance and remain with it.

In the form of floating detector station shown in Fig. 2a a series of fixed but differently oriented crystal pick-up units 38' are employed and, in such an instance, the motor 44 and its associated mechanism is dispensed with. While any desired number of the pick-up units may be employed, in the present instance four have been shown, these units being directed radially and each unit being disposed at an angle of 90° from the next adjacent units.

Where plural pick-up units are employed, these units may be connected together in electrical parallelism with a common input connection to the amplifier 63. By such an arrangement, all four of the units remain effective in the detection of sound, but it is obvious that the particular pick-up unit whose directional axis extends in the general direction of the sound disturbance will receive the sound signal at a greater intensity than the remaining units and will, therefore, be more instrumental in the input circuit of the amplifier.

The precise electronic circuits employed at the detector station are immaterial to the present invention and the various amplifying, modulating, oscillating and transmitting devices may vary considerably within the scope of the invention. In general, it is deemed sufficient to state that it is preferable to employ electronic circuits wherein the vacuum tubes are of the filamentary cathode type in order that there shall be very little drain upon the power supply. The transmitter and amplifier, as described above, are designed for extremely high efficiency without particular regard to distortion.

*The relay station*

Referring now to Figs. 5 and 6 wherein the electrical apparatus at the relay station 16 is diagrammatically shown, this apparatus includes a constantly energized combined transmitter and receiver 120 (Fig. 6) and a selector unit 122 (Fig. 5), the latter including a class AB push-pull ultra high frequency oscillator-transmitter 124, the frequency of which may be varied by varying the inductance of the plate and filament tuned circuits. The selector unit also includes a fixed frequency super-regenerative receiver 125 which may be substantially identical with the receiver 64 and means are provided whereby the receiver may be controlled at the shore station 14 in such a manner that each time it receives an impulse signal a distributor or strowger switch 126 is indexed and the latter is caused to energize a magnetically controlled frequency selecting apparatus 128, by means of which the oscillator-transmitter 124 is caused to change its frequency of operation.

The combined receiver and transmitter of Fig. 6 may be of more or less conventional design, including as it does a receiving antenna 130 and one or more amplifying stages 132 leading up to a modulator 134, by means of which the carrier frequency of a fixed frequency transmitter 136 is modulated and the attendant signals retransmitted from a transmitter antenna 138. Signals transmitted from any one of the selected detector stations 18 at a fixed frequency common to all of the transmitters 61 are received by the antenna 130 and retransmitted at a predetermined frequency to the shore station 14.

Referring now to Fig. 5, the oscillator-transmitter 124 includes a pair of tuning bars 140 which form a part of the plate tank circuit and a similar pair of tuning bars 142 forming a part of the filament tank circuit. The bars 140 and 142 have associated therewith a pair of slide bars 146 and 144 respectively, which are capable of occupying various positions along the lengths of the bars with which they are associated and which serve to vary the inductance value of the respective tank circuits.

The slide bars 144 and 146 are connected by means of pin and slot connections 148 to the armatures 150 of respective electromagnets 152 and 154, and are normally urged inwardly toward each other by means of a pair of springs 156. The tendency of the slide bars 144 and 146 is thus to move in such a direction as to effectively shorten the inductive path of the tank circuit in which each is located and when the bars are so moved the frequency of the oscillator 124 is increased accordingly.

Simultaneous or correlated movement of the bars 144 and 146 is effected and controlled by means of a plurality of electromagnetically operated dogs or abutments 158 which, in addition to their identifying numeral, have been labeled $a$, $b$, $c$ and $d$, and $a'$, $b'$, $c'$ and $d'$, the former group controlling movement of the bar 144 in the filament circuit and the latter group controlling movement of the bar 146 in the plate circuit of the oscillator-transmitter 124. The dogs 158 normally project into the path of movement of their respective slide bars 144 or 146, as the case may be, and are adapted to be successively retracted in pairs in order to permit the two slide bars to move inwardly in unison a predetermined distance as each pair of dogs is withdrawn from the path of movement of its respective slide bar.

Corresponding dogs in the two series thereof are adapted to be actuated in unison and in such relative order that the slide bars move from initial positions to second positions and from thence to third and fourth positions in succession. Accordingly, the various dogs are pivotally connected to the armatures 160 of respective electromagnets 162, these electromagnets being labeled in pairs A, B, C and D, and A', B', C' and D'. The windings of all of the magnets in the two series are connected together in common and the terminals of corresponding magnets in the two series are connected together and a common connection is made from each pair of magnets to one of a series of circularly arranged contacts labeled A'', B'', C'' and D'' included in the selector switch 126.

The switch 126 is provided with a common selector arm or wiper 163, by means of which the various circularly arranged contacts are connected to the positive side of the power line to effectively simultaneously energize the various pairs of magnets A, A'; B, B'; etc., successively as the switch 126 is indexed. Upon indexing of the switch 126 periodically it will be seen that the various pairs of dogs $a$, $a'$; $b$, $b'$; etc., will be successively withdrawn from the path of movement of the slide bars whose movements they control to successively decrease the inductive paths of the two tank circuits and consequently increase the frequency of operation of the oscillator-transmitter. The operation continues until the slide bars attain their innermost positions and bear against stationary abutments 164, at which time the inductive paths are at a minimum and the frequency of transmission is at a maximum. The selector switch 126 is provided with a fifth contact labeled R which, upon engagement with the arm 163, permits energization of the magnets 152 and 154 by means of which the slide bars 144 and 146 are returned to their initial positions against the action of the tension springs 156.

The dogs 158 are flexibly mounted for limited lateral shifting between a plurality of guide pins 167 and the extreme ends thereof are beveled as at 166 in order that the slide bars 144 and 146 may readily by a camming action pass the pins during the return strokes thereof.

Actuation or indexing of the selector switch 126 is controlled at the shore station through the medium of the superregenerative receiver 125 at the relay station and similar in its design and operation to the receiver 64 which has disposed in its output circuit a high resistance relay magnet 168 similar to the magnet 66. The magnet 168 upon deenergization allows a pair of contacts 169 to close, thus establishing a local circuit through a magnet 171, the armature 170 of which is connected to a ratchet and pawl mechanism 172 associated with the selector or distributor arm 163. The receiver, like the receiver 64, is maintained energized and oscillates at a suitable audio frequency until such time as a signal is received, whereupon oscillation ceases and a decrease in plate current takes place to deenergize the magnet 168 and energize the magnet 171. Thus it will be seen that each time a signaling impulse is sent out at the shore station 14 and received at the relay station 16, the inductive path of the two tank circuits is shortened a predetermined amount in order that the oscillator-transmitter will operate at a different and shorter frequency. The various detector stations are, of course, set to operate at the selected frequencies capable of being transmitted from the relay station and thus these former stations may be selected in succession.

The shore station

Referring now to Figs. 3 and 7, the shore station apparatus includes an impulsing transmitter 179 and a conventional receiver 180 having antennas 181 for each of the selecting signal impulses transmitted by the relay station. Thus, these impulses are transmitted not only to the various detector station superregenerative receivers 64 but are also transmitted back to the central or shore station 14. The various receivers are coupled to class B amplifiers 182 having relay electromagnets 184 in their plate circuits. Associated with each magnet 184 are a pair of normally open contacts 186 operable upon closing thereof to cause energization of a second relay magnet 188 which operates to close a pair of normally open contacts 190 arranged in series with a lamp 192 or other similar signaling device. The lamps may be marked with suitable numbers or other indicia by means of which the operator may determine which detector station 18 he has selected.

Each of the magnets 188 has associated therewith a pair of locking contacts 194 arranged in series with a transmitter key 196 associated with the impulsing transmitter 179. The transmitter 179 is of more or less conventional design and is provided with an antenna 198, by means of which radiations are emitted for transmission to the relay station 16 in order to periodically index the selector or strowger switch 126. Each time an impulse is sent out by means of the transmitter key 196, one of the locked relay magnets 188 is unlocked or deenergized and, upon reception of the next signal the next relay in the series is energized and its respective lamp 192 is energized.

Referring now to Fig. 3, the shore station 14 also includes a highly directional antenna 200 by means of which retransmitted sound signals issuing from the antenna 138 of the transmitter 136 at the relay station 16 are received and conducted to a radio frequency amplifier illustrated in block diagram at 202. These signals may be analyzed by means of an oscilloscope 204 or they may be conducted to a superregenerative detector 206 wherein signal separation of the audio frequency signals takes place with the audio signals going to an amplifier 208 for aural analysis by means of a loud speaker 210 or other suitable audio device.

Modifications may be resorted to within the scope of the appended claims.

What is claimed is:

1. In a sound detection system of the character described, a central shore station, a plurality of automatically operable floating outlying offshore stations including a relay station and a plurality of detector stations; sound-responsive means at each of said detector stations for detecting an underwater sound disturbance, a radio transmitter connected to said sound-responsive means for radio transmission of signals corresponding to the detected underwater sound disturbance, said sound-responsive means and transmitter normally remaining deenergized, a radio receiver, and means operable upon reception of a signal by said receiver for energizing said sound-responsive means and transmitter, the receivers at the various detector stations being responsive to radio signals of different frequencies; a receiver at said relay station responsive to signals transmitted from any one of said transmitters, a radio transmitter connected to said receiver for radio transmission of signals corresponding to the signals received by said receiver, a constantly energized variable frequency radio transmitter capable of transmitting signals at the frequencies to which said receivers at the detector stations are responsive, and means for selectively altering the frequency characteristic of said latter transmitter including an impulse-receiving radio device responsive to radio signals of a predetermined frequency, a receiver at the shore station responsive to signals transmitted from said first mentioned transmitter at the relay station, means for analyzing signals received by said last mentioned receiver, and a radio transmitter for transmitting radio impulses to said impulse-receiving device at the relay station for varying the frequency characteristic of the transmitter thereat to selectively energize said sound-responsive means and transmitters at the various detector stations.

2. In a detector system of the character described, a floating relay station for transmitting radio signals at different frequencies to a plurality of normally deenergized detector stations for selectively energizing the latter and for automatic operation from a central station including an ultra high frequency radio transmitter having means for varying its frequency of operation, said frequency varying means comprising a pair of parallel arranged guide bars and a slide bar movable therealong, from an initial position to an intermediate position and from thence to a final position, means normally urging said bar to its final position, latch means for holding said bar selectively in its initial and intermediate positions, said guide bars and slide bar forming a variable inductance tank circuit for the transmitter, electromagnetically operable means for releasing said latch means to allow the bar to move to its final position from either its initial position or its intermediate position, and a radio receiver having an output circuit connected to said electromagnetically operable means and operable upon reception of a radio signal impulse from the central station to energize said electromagnetically operable means.

3. In a detector system of the character described, a floating relay station for transmitting radio signals at different frequencies to a plurality of normally deenergized detector stations for selectively energizing the latter and for automatic operation from a central station including an ultra high frequency radio transmitter having means for varying its frequency of operation, said frequency varying means comprising a pair of parallel arranged guide bars and a slide bar movable therealong, said guide and slide bars forming a variable inductance tank circuit for the transmitter, means normally urging said slide bar in one direction along said guide bars from an initial position to a position wherein the inductance of said tank circuit is at a minimum, a stop finger positioned in the path of movement of said slide bar and engageable with the latter for maintaining the same in its initial position, said finger being movable to a retracted position to allow the slide bar to move to its position of minimum inductance, an electromagnet operable upon energization thereof to move said finger to its retracted position, and a radio receiver operable upon reception of a radio signal impulse from the central station to energize said electromagnet.

4. In a detector system of the character described, a floating relay station for transmitting radio signals at different frequencies to a plurality of normally deenergized detector stations for selectively energizing the latter and for automatic operation from a central station including an ultra high frequency radio transmitter having means for varying its frequency of operation, said frequency varying means comprising a pair of parallel arranged guide bars and a slide bar movable therealong, said guide and slide bars forming a variable inductance tank circuit for the transmitter, means normally urging said slide bar in one direction along said guide bars from an initial position to a position wherein the inductance of said tank circuit is at a minimum, a stop finger positioned in the path of movement of said slide bar and engageable with the latter for maintaining the same in its initial position, said finger being movable to a retracted position to allow the slide bar to move to its position of minimum inductance, an electromagnet operable upon energization thereof to move said finger to its retracted position, a normally open circuit for said electromagnet, and means for closing said circuit comprising a relay magnet, a circuit closing switch operable thereby, and a radio receiver having an output circuit in which said relay magnet is disposed, said receiver being responsive to signal impulses generated at the central station.

5. In a detector system of the character described, a floating relay station for transmitting radio signals at different frequencies to a plurality of normally deenergized detector stations for selectively energizing the latter and for automatic operation from a central station including an ultra high frequency radio transmitter having means for varying its frequency of operation, said frequency varying means comprising a pair of parallel arranged guide bars and a slide bar movable therealong, said guide and slide bars forming a variable inductance tank circuit for the transmitter, means normally urging said slide bar in one direction along said guide bars from an initial position to a position wherein the inductance of said tank circuit is at a minimum, a stop finger positioned in the path of movement of said slide bar and engageable with the latter for maintaining the same in its initial position, said finger being movable to a retracted position to allow the slide bar to move to its position of minimum inductance, an electromagnet operable upon energization thereof to move said finger to its retracted position, a normally open circuit for said electromagnet, and means for closing said circuit comprising a high resistance winding electromagnet, a normally open circuit closing switch operable upon deenergization of said magnet to close said switch, a superregenerative radio receiver, means normally maintaining said receiver in oscillation to provide a relatively large flow of current in its plate circuit, said high resistance electromagnet being disposed in said plate circuit, said receiver being responsive to signal impulses transmitted from the central station to cause said receiver to cease its oscillations and reduce the plate current thereof to deenergize said high resistance electromagnet.

6. In a detector system of the character described, a floating relay station for transmitting radio signals at different frequencies to a plurality of normally deenergized detector stations for selectively energizing the latter and for automatic operation from a central station comprising an ultra high frequency radio transmitter having means for varying its frequency of operation, said frequency varying means comprising a pair of parallel arranged guide bars and a slide bar movable therealong, said guide and slide bars forming a variable inductance tank circuit for the transmitter, means normally urging said slide bar in one direction along said guide bars from an initial position wherein the inductance of said tank circuit is at a maximum to a final position wherein the inductance of said tank circuit is at a minimum, a plurality of stop fingers positioned in the path of movement of said slide bar at different positions therealong, said fingers being movable successively to retracted positions out of the path of movement of said slide bar to allow the latter to progressively move inwardly toward its position of minimum inductance, an electromagnet for each of said fingers operable upon energization thereof to move its respective finger to its retracted position, means for energizing said electromagnets in succession comprising a local circuit for each electromagnet, a selector switch for successively energizing said circuits, an electromagnet for periodically indexing said selector switch and a radio receiver operable upon reception of a radio signal of predetermined frequency from the central station to energize said latter electromagnet.

7. In a detector system of the character described, a floating relay station for transmitting radio signals at different frequencies to a plurality of normally deenergized detector stations for selectively energizing the latter and for automatic operation from a central station comprising an ultra high frequency radio transmitter having means for varying its frequency of operation, said frequency varying means comprising a pair of parallel arranged guide bars and a slide bar movable therealong, said guide and slide bars forming a variable inductance tank circuit for the transmitter, means normally urging said slide bar in one direction along said guide bars from an initial position wherein the inductance of said tank circuit is at a maximum to a final position wherein the inductance of said tank circuit is at a minimum, a plurality of stop fingers positioned in the path of movement of said slide bar at different positions therealong, said fingers being movable successively to retracted positions out of the path of movement of said slide bar to allow the latter to progressively move inwardly toward its position of minimum inductance, an electromagnet for each of said fingers operable upon energization thereof to move its respective finger to a retracted position out of the path of movement of said slide bar, means for successively energizing said electromagnets comprising a local circuit for each electromagnet, a selector switch for successively closing said circuits, an electromagnet operable upon energization thereof to periodically index said selector switch, a normally open local circuit for said latter electromagnet, and means for periodically closing said normally open circuit comprising a normally open relay switch in said latter circuit, a high resistance electromagnet therefor operable upon deenergization thereof to close said latter switch and a superregenerative radio receiver having an output circuit in which said high resistance electromagnet is disposed, said superregenerative receiver normally oscillating at a predetermined frequency and operable upon reception of a signal of predetermined frequency from the central station to cease its oscillation whereby a decrease of plate current will flow through said high resistance electromagnet and deenergize the same.

8. In a detector system of the character described, a floating relay station for transmitting radio signals at different frequencies to a plurality of normally deenergized detector stations for selectively energizing the latter and for automatic operation from a central station including an ultra high frequency radio transmitter having means for varying its frequency of operation, said frequency varying means comprising a pair of parallel arranged guide bars and a slide bar movable therealong, said guide and slide bars forming a variable inductance plate tank circuit for the transmitter, a second pair of parallel arranged guide bars and a slide bar movable therealong, said latter guide and slide bars forming a variable filament tank circuit for the transmitter, means normally urging said slide bars from initial positions wherein the inductance of their respective tank circuits is at a maximum to final positions wherein the inductance of their respective tank circuits is at a minimum, a plurality of latching fingers positioned in the path of movement of each of said slide bars and engageable therewith for maintaining the same in various positions along the guide bars, and means for simultaneously moving the latching fingers out of the path of movement of their respective slide bars in such a manner as to cause said slide bars to move progressively toward their positions of minimum inductance comprising an electromagnet for each latching finger operable upon energization thereof to retract the latter, a plurality of local circuits for said electromagnets, means for successively energizing said circuits comprising a selector switch, an electromagnet operable upon energization thereof to actuate said selector switch and a radio receiver operable upon reception of a radio signal from said central station to energize said latter electromagnet.

9. In a sound detection system of the character described, a central shore station, a plurality of automatically operable floating outlying off-shore stations including a single relay station and a plurality of detector stations; sound-responsive means at each of said detector stations for detecting an underwater sound disturbance, a radio transmitter connected to said sound-responsive means for radio transmission of signals corresponding to the detected underwater sound disturbance, said sound-responsive means and transmitter normally remaining deenergized, a radio receiver, and means operable upon reception of a signal by said receiver for energizing said sound-responsive means and transmitter, the receivers at the various detector stations being responsive to radio signals of different frequencies; a receiver at the relay station responsive to signals transmitted from any one of said transmitters, a radio transmitter connected to said receiver for radio transmission of signals corresponding to the signals received by said receiver, a constantly energized variable frequency radio transmitter capable of transmitting signals at the frequencies to which said receivers at the detector stations are responsive, and means for selectively altering the frequency characteristic of said latter transmitter including an impulse-receiving radio device responsive to radio signals of a predetermined frequency; a receiver at the shore station responsive to signals transmitted from said first mentioned transmitter at the relay station, means for analyzing signals received by said last mentioned receiver, a radio transmitter for transmitting radio impulses to said impulse receiving device at the relay station for varying the frequency characteristic of the transmitter thereat to selectively energize said sound-responsive means and transmitters at the various detector stations, a plurality of radio receivers responsive at the various frequencies to which said radio transmitter at the relay station is altered, and means operable upon selective reception of transmitted signals by said latter receivers for indicating the particular detector station which has been energized.

WILLIAM J. A. BAILEY.
HUGO A. PANISSIDI.

REFERENCES CITED

The following references are of record in the file of this patent:

UNITED STATES PATENTS

| Number | Name | Date |
|---|---|---|
| 2,235,010 | Chaffee | Mar. 18, 1941 |
| 1,624,966 | Morris | Apr. 19, 1927 |
| 2,014,518 | Beverage | Sept. 17, 1935 |
| 717,509 | Stone | Dec. 30, 1902 |
| 1,657,498 | Demarest et al. | Jan. 31, 1928 |
| 2,085,424 | Goddard | June 29, 1937 |
| 2,117,090 | Grundmann | May 10, 1938 |
| 2,218,223 | Usselman et al. | Oct. 15, 1940 |
| 2,177,493 | Koulichkov | Oct. 24, 1939 |
| 1,901,185 | Nelson | Mar. 14, 1933 |

FOREIGN PATENTS

| Number | Country | Date |
|---|---|---|
| 435,153 | Great Britain | Sept. 16, 1935 |
| 596,439 | Germany | May 3, 1934 |
| 335,125 | Italy | Feb. 1, 1936 |
| 523,880 | Germany | Apr. 29, 1931 |